(12) United States Patent
Holman et al.

(10) Patent No.: US 10,902,439 B2
(45) Date of Patent: *Jan. 26, 2021

(54) SYSTEM AND METHOD FOR COLLECTING REAL-WORLD DATA IN FULFILLMENT OF OBSERVATION CAMPAIGN OPPORTUNITIES

(71) Applicant: Observa, Inc., Seattle, WA (US)

(72) Inventors: Hugh Howard Holman, Seattle, WA (US); Erik Eugene Chelstad, Seattle, WA (US)

(73) Assignee: Observa, Inc., Seattle, WA (US)

( * ) Notice: Subject to any disclaimer, the term of this patent is extended or adjusted under 35 U.S.C. 154(b) by 230 days.

This patent is subject to a terminal disclaimer.

(21) Appl. No.: 15/239,564

(22) Filed: Aug. 17, 2016

(65) Prior Publication Data
US 2018/0053195 A1    Feb. 22, 2018

(51) Int. Cl.
*G06Q 30/02*    (2012.01)
(52) U.S. Cl.
CPC ................ *G06Q 30/0201* (2013.01)
(58) Field of Classification Search
CPC ................................... G06Q 30/0201
See application file for complete search history.

(56) References Cited

U.S. PATENT DOCUMENTS

| | | | | |
|---|---|---|---|---|
| 6,026,387 A * | 2/2000 | Kesel | ............ | G06Q 30/02 706/45 |
| 6,633,851 B1 * | 10/2003 | Engler | ............ | G06Q 10/10 705/21 |
| 8,064,896 B2 * | 11/2011 | Bell | ............ | H04L 12/1859 455/422.1 |
| 9,361,353 B1 | 6/2016 | Aristides | | |
| 9,508,082 B1 | 11/2016 | Mannix et al. | | |
| 2003/0009373 A1 | 1/2003 | Ensing et al. | | |

(Continued)

OTHER PUBLICATIONS

The reliability and validity of objective measures of customer service: mystery shopping J Dawes, B Sharp—Australian Journal of Market Research, 2000—researchgate.net (Year: 2000).*

(Continued)

*Primary Examiner* — Jonathan G Sterrett
(74) *Attorney, Agent, or Firm* — FisherBroyles LLP; Kevin D. Jablonski (57) ABSTRACT

Systems, apparatuses, and methods for observing and collecting real-world data about conditions, standards, guidelines, rules and restrictions established by a coordinator of an observation campaign. One embodiment may include a user-based mobile computing device (e.g., a smart phone) configured to execute an observation application to coordinate observing and collecting of real-world data. Further, the mobile computing device may include a communication module configured to send collected real-world data to an observation server computer. Upon verification of the collected real-world data, the observation platform may coordinate compensation to a user of the mobile computing device in exchange for the successful observation and collection of the requested real-world data. Additional observation opportunities may be triggered for observers in response to a successful fulfillment of an opportunity.

20 Claims, 5 Drawing Sheets

(56) References Cited

U.S. PATENT DOCUMENTS

| | | | |
|---|---|---|---|
| 2004/0034684 A1* | 2/2004 | Payne | G06Q 10/10 709/201 |
| 2005/0149382 A1 | 7/2005 | Fenner et al. | |
| 2006/0167971 A1 | 7/2006 | Breiner | |
| 2008/0183552 A1 | 7/2008 | O'Hagan | |
| 2009/0063306 A1 | 3/2009 | Fano et al. | |
| 2009/0204471 A1 | 8/2009 | Elenbaas et al. | |
| 2009/0240516 A1 | 9/2009 | Palestrant | |
| 2010/0171826 A1 | 7/2010 | Hamilton et al. | |
| 2011/0212717 A1 | 9/2011 | Rhoads et al. | |
| 2012/0029978 A1* | 2/2012 | Olding | G06Q 10/06 705/7.42 |
| 2012/0047008 A1 | 2/2012 | Alhadeff et al. | |
| 2012/0265574 A1* | 10/2012 | Olding | G06Q 10/06 705/7.14 |
| 2013/0018957 A1* | 1/2013 | Parnaby | G06Q 50/01 709/204 |
| 2013/0079128 A1 | 3/2013 | Thomas et al. | |
| 2013/0132170 A1 | 5/2013 | Yelisetti et al. | |
| 2013/0132987 A1* | 5/2013 | Narasimhan | H04N 21/25866 725/14 |
| 2013/0204652 A1 | 8/2013 | Marins et al. | |
| 2013/0282446 A1 | 10/2013 | Dobell | |
| 2014/0180772 A1 | 6/2014 | Tutupata et al. | |
| 2014/0249889 A1 | 9/2014 | Park et al. | |
| 2014/0278850 A1* | 9/2014 | Boccuzzi, Jr. | G06Q 30/0208 705/14.11 |
| 2014/0324555 A1* | 10/2014 | Wu | G06Q 10/06398 705/7.42 |
| 2014/0343984 A1* | 11/2014 | Shahabi | G06Q 10/06311 705/7.13 |
| 2014/0379399 A1* | 12/2014 | Brydon | G06Q 10/06 705/7.15 |
| 2015/0032533 A1 | 1/2015 | Raab et al. | |
| 2015/0178742 A1* | 6/2015 | Smith | H04L 67/36 705/7.29 |
| 2015/0213315 A1* | 7/2015 | Gross | G06F 16/5838 382/159 |
| 2015/0254593 A1* | 9/2015 | Ramos Rinze | G06Q 10/06398 705/7.13 |
| 2015/0347520 A1 | 12/2015 | King et al. | |
| 2015/0356489 A1* | 12/2015 | Kazai | G06Q 10/06398 705/7.42 |
| 2016/0027051 A1* | 1/2016 | Gross | G06Q 50/16 705/14.54 |
| 2016/0078499 A1 | 3/2016 | Brown et al. | |
| 2016/0180365 A1 | 6/2016 | Shi et al. | |
| 2016/0253710 A1 | 9/2016 | Publicover et al. | |
| 2016/0350697 A1* | 12/2016 | Gruen | G06Q 10/06395 |
| 2017/0053330 A1 | 2/2017 | Smith et al. | |
| 2017/0098197 A1 | 4/2017 | Yu et al. | |
| 2017/0221156 A1* | 8/2017 | Mingarelli | G06Q 50/01 |
| 2017/0249574 A1* | 8/2017 | Knijnik | G06Q 10/06313 |
| 2017/0331877 A1 | 11/2017 | Balasubramanian et al. | |
| 2018/0293616 A1 | 10/2018 | Greenhood | |

OTHER PUBLICATIONS

The future of hotel rating W Hensens—Journal of Tourism Futures, 2015—emeraldinsight.com (Year: 2015).*

Mobile System for Customer Feedback Collection PBJ Kadlubiec—core.ac.uk 2013 (Year: 2013).*

"Crowdforge: Crowdsourcing complex work", A Kittur, B Smus, S Khamkar, RE Kraut—Proceedings of the 24th annual . . . , 2001—dl.acm.org (Year: 2011).*

Quality control in crowdsourcing systems: Issues and directions M Allahbakhsh, B Benatallah, A Ignjatovic . . . —IEEE Internet . . . , 2013—ieeexplore.ieee.org (Year: 2013).* http://web.archive.org/web/20150226150240/http://www.gigwalk.com/crowdsourcing (Year: 2015).* http://web.archive.org/web/20150223140532/http://www.gigwalk.com/case-study/Gigwalk_mobileretail_whitesheet.html (Year: 2015).*

Position validation in crowdsourced accessibility mapping RM Rice, AO Aburizaiza, MT Rice . . . - . . . : The International Journal . . . , 2016—utpjournals.press (Year: 2016).*

The motivations and experiences of the on-demand mobile workforce R Teodoro, P Ozturk, M Naaman, W Mason . . . —Proceedings of the 17th . . . , 2014—dl.acm.org (Year: 2014).*

ISR/WO dated Jan. 30, 2018 for PCT/US17/062829; filed Nov. 21, 2017.

Grocery & Retail News. "Get Paid for Snooping on Your Supermarket," <URL: http://couponsinthenews.com/2016/05/16/get-paid-for-snooping-on-your-supermarket/>.

ISR/WO dated Mar. 8, 2018; for PCT/US17/062816, filed Nov. 21, 2017.

Transferring Knowledge from a Crowd to a Retail Company—A case study of Roamier Sweden S. Gistera, M. Carlander—2015—diva-portal.org (2015).

"A Conceptual Model for Mystery Shopping Motivations", P. Allison, D. Severt, D. Dickson—Journal of Hospitality Marketing & . . . , 2010—Taylor & Francis (2010).

Exploring the Consequences of Shopper-Facing Technologies: Their Effect on Shopper Experiences and Shopping Outcomes; BI Spaid—2014—trace.tennessee.edu (2014).

Applying the service profit chain in a retail environment: Challenging the "Satisfaction mirror", R. Silvestro, S. Cross—International Jounral of Service Industry . . . , 2000—emeraldinsignt.com (Year: 2000).

"Applying the service profit chain to analyse retail performance: the case of the managerial strait-jacket?" M. Pritchard, R. Silvestro—International Journal of Service . . . , 2005—emeraldinsight.com (Year: 2015).

Morse, David; "MINISIZE2: A computer program for determining effect size and minimum sample size for statistical significance for univariate, multivariate, and nonparametric tests", Educational and Psychological Measurement; 1999—journals.sagepub.com (Year: 1999).

* cited by examiner

SYSTEM AND METHOD FOR COLLECTING REAL-WORLD DATA IN FULFILLMENT OF OBSERVATION CAMPAIGN OPPORTUNITIES

BACKGROUND

Individuals and businesses often desire to collect data about various situations that exist in the real-world. For example, a manufacturer of a product may wish to collect data about how the product is being displayed at a retail location. However, individuals and enterprises, and government and non-governmental agencies often do not have the time and/or resources available to travel to myriad locations or employ agents to do so. This challenge becomes amplified as the time window for the information collection becomes more specific and/or the physical locations from which the information is to be collected grow in number or distance. For example, merchants in the delivery chain of products for retail sale, whether manufacturers, wholesalers, brokers, or the like, may need to determine if, when, how much, in what way or condition, or at what price their goods are being put in front of consumers. Another example might be a property or business owner that contracts for a periodic service about which they would like to validate the quality and completeness of service delivery. In short, the condition of physical locations or some physically observable condition at the locations is desirable data to observe, obtain, and document.

Sometimes these needs for data occur in a predictable recurring pattern. The data may also be best obtained within a narrow time window. For example, a restaurant owner checking on bathroom cleanliness may only desire to obtain the information for the first hour in which a restaurant is open, as after that, customers may have used the bathrooms extensively. In another example, merchants who sell goods and products through retailers often have guidelines, rules, and restrictions for how various retailers are to present and price the goods and products at the purchase location. For example, merchants may wish to negotiate with retailers for specific shelf space for the merchant's goods and products or the merchant may wish to disallow lowering of the retail price for the merchant's goods and products.

Individuals and business wishing to obtain observable real-world data may hire staff to ensure that the various standards, conditions, guidelines, rules, and/or restrictions are met. That is, employees or agents may travel to various locations at various times to observe and collect the real-world data with regard to various conditions, guidelines, rules, and/or restrictions in order to ensure satisfaction and compliance. Of course, such employees and agents can be expensive in terms of payroll and travel expenses. Therefore, organizations often must rely on others to follow the negotiated conditions, guidelines, rules, and restrictions. However, at times, those other actors often have little incentive to go to any great length to ensure that standards or conditions are met or to ensure compliance with applicable guidelines, rules, and/or restrictions. As a result, many businesses are unable to ensure that their standards, conditions, guidelines, rules, and/or restrictions are followed with regularity.

BRIEF DESCRIPTION OF THE DRAWINGS

Embodiments of the subject matter disclosed herein in accordance with the present disclosure will be described with reference to the drawings, in which.

Note that the same numbers are used throughout the disclosure and figures to reference like components and features.

DETAILED DESCRIPTION

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. This systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

By way of overview, the systems and methods discussed herein may be directed to an observation platform for coordinators, merchants, retailers, users and others to establish, utilize and fulfill an observation campaign designed to verify real-world implementations and other data surrounding observable, standards, conditions, rules, guidelines, and/or restrictions. The observable data points may be part of an overall strategy in an observation campaign established by an observation campaign coordinator. Such a strategy may often involve determining data points like specific product placement, product pricing, and product incentives at the retail location. A user of this platform, called an observer hereinafter, may use an application downloaded to and executing on a computing device, to identify specific observation campaign opportunities. An observation campaign may be a set of verifiable parameters that define specifics about an observation campaign strategy. These verifiable parameters may include specific observable and verifiable real-world data such as where a product is placed on a retail shelf, whether promotional materials are displayed with the product, inventory count, and product pricing.

Once an opportunity is identified and accepted, the user may collect the real-world data through various methods including, key entry, sound recording, video recording and image capture (using one or more applications executing on a computing device, such as a mobile phone), temperature observance, barometric pressure observance and sound-pressure level observance. The captured real-world data may then be uploaded to the observation platform in order to determine if the parameters of the observation campaign have been met (e.g., correct data, clear image, timely collection, and the like). If the collected and now uploaded real-world data is verified, then the merchant may be notified that new real-world data has been collected and the observer may be compensated (financial or otherwise) for successfully collecting real-world data as part of an observation campaign. These and other aspects are described in greater detail below with respect to FIGS. 1-5.

Figure 1:
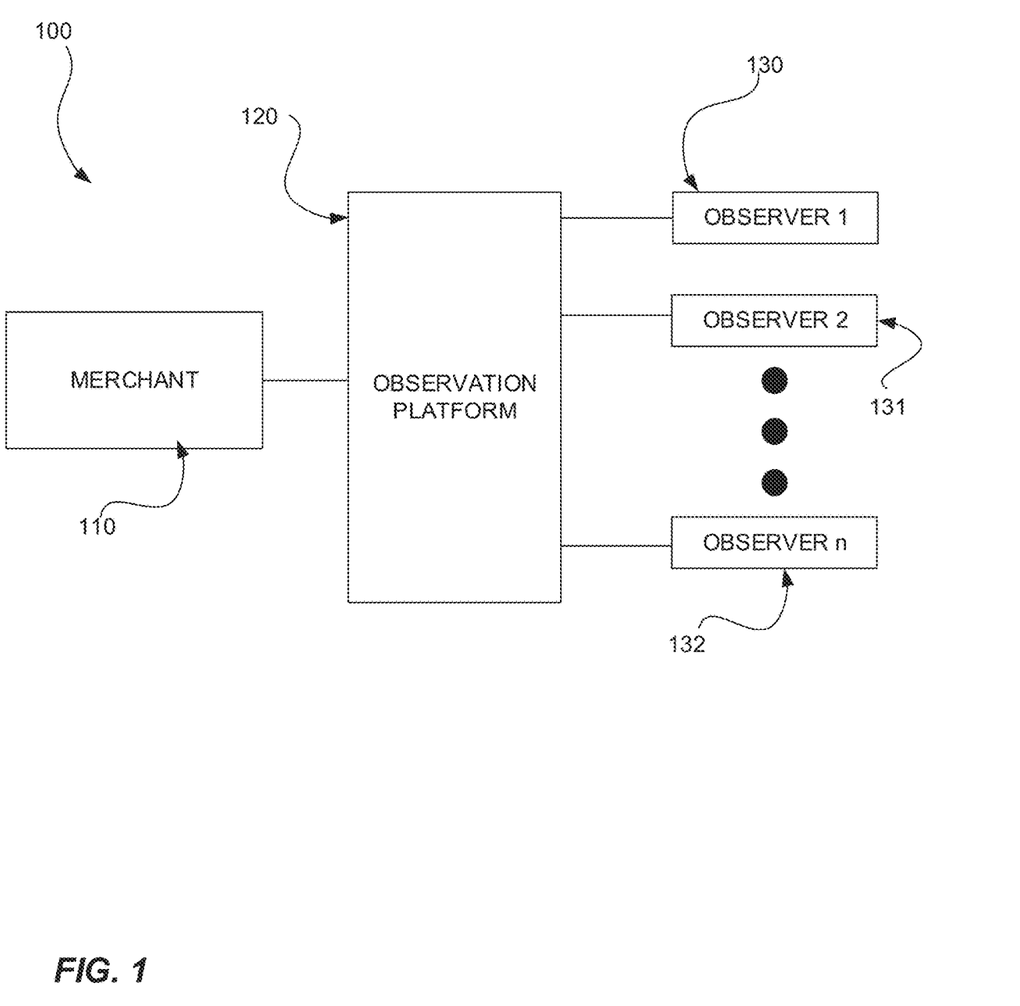
FIG. 1 is a basic block diagram illustrating elements or components of an example system in which an embodiment of the subject matter disclosed herein may be implemented.

FIG. 1 is a basic block diagram illustrating elements or components of an example system 100 in which an embodiment of the subject matter disclosed herein may be implemented. In the context of FIG. 1 and other figures, a continuing example of a merchant-based observation campaign will be used. Thus, various real-world data points specific to a merchant that sells goods at retail locations will also be used in context. A skilled artisan understands that the coordinator of an observation campaign need not be a merchant with merchant-specific data points. For example, a coordinator of an observation campaign may be a quality-assurance coordinator seeking to collect data about installations of observable projects, e.g., power transmission pole installations, bathroom conditions in public transit, traffic conditions, and the like. In short, a coordinator of an observation campaign may be any individual, business, government agency or entity that wishes to incentivize observers to collect real-world data from myriad locations. However, for ease of illustration and for consistent examples, the remaining disclosure will use the merchant product and retail location example without limiting the interpretation or scope of the claims or specification.

As discussed briefly above in an overview, an observation platform 120 provides systems and methods for a merchant 110 to establish and implement an observation campaign for various observers 130, 131, and 132 to collect real world data about the observation campaign established by the merchant 110. In this system 100, the merchant block 110, the observation platform block 120 and each observer block 130, 131, and 132 may represent a separate computing device or group of computing devices. Further, the connections between these computing devices may be any communication link, such as the Internet, BlueTooth™ wireless, direct serial link, and the like. The various computing device implementations and embodiments are discussed below.

The observation platform 120 may be embodied in whole or in part as a computing system that includes one or more server computers configured in a cloud-based computing environment. Embodiments may take the form of a hardware implemented embodiment, a software implemented embodiment, or an embodiment combining software and hardware aspects. Further, various computing aspects of the underlying systems and methods may transcend any specific computing entity and the "block" diagram nature of FIG. 1 is intended to illustrate one embodiment. For example, in some embodiments, one or more of the operations, functions, processes, or methods described herein may be implemented by one or more suitable processing elements (such as a processor, microprocessor, CPU, controller, etc.) that are part of a client device, server, network element, or other form of computing or data processing device/platform and that is programmed with a set of executable instructions (e.g., software instructions), where the instructions may be stored in a suitable non-transitory data storage element. In some embodiments, one or more of the operations, functions, processes, or methods described herein may be implemented by a specialized form of hardware, such as a programmable gate array, application specific integrated circuit (ASIC), or the like. This detailed description is, therefore, not to be taken in a limiting sense.

As alluded to, in some embodiments, the subject matter may be implemented in the context of a "cloud" based computing environment typically used to develop and provide web services and business applications for end users. Further aspects of an exemplary implementation environment will be described with reference to FIGS. 2-5 below. Note that embodiments may also be implemented in the context of other computing or operational environments or systems, such as for an individual business data processing system, a private network used with a plurality of client terminals, a remote or on-site data processing system, another form of client-server architecture, and the like.

The merchant computing device 110 may also be one or more of any number of computing device implementations. In one embodiment, the merchant computing device 110 may be a personal computer or mobile computing device. The merchant computing device 110 may be communicatively coupled to the observation platform 120 through an Internet connection or other communication network. Further, the merchant computing device 110 may be configured to execute a merchant observation application (not shown) that may provide various graphical user interfaces (GUIs) for a merchant to navigate and utilize the observation platform 120, such as, for example, establishing an observation campaign. Various operations and parameters of the merchant computing device 110 are described further below with respect to FIG. 2.

Each observer computing device 130, 131, and 132 may also be one or more of any number of computing device implementations. In one embodiment, each observer computing device 130, 131, and 132 may be a mobile computing device. Each observer computing device 130, 131, and 132 may be communicatively coupled to the observation platform 120 through an Internet connection or other communication network. Further, each observer computing device 130, 131, and 132 may be configured to execute an observer application (not shown) that may provide various GUIs for an observer to navigate and utilize the observation platform 120, such as, for example, fulfilling an opportunity in an observation campaign. Various operations and parameters of the observer computing devices 130, 131, and 132 are also described further below with respect to FIG. 2.

Figure 2:
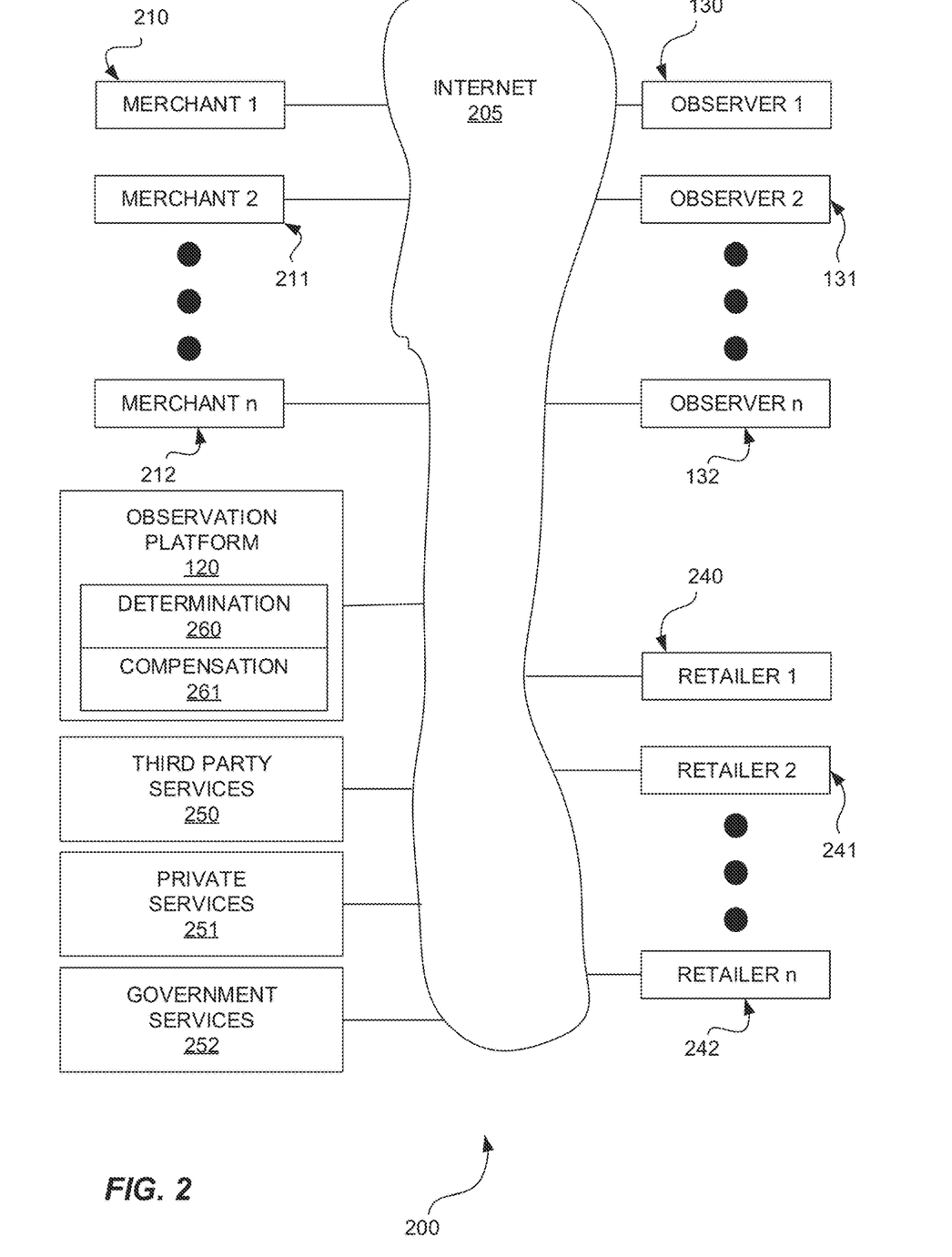
FIG. 2 is a more detailed block diagram of the basic system of FIG. 1 illustrating elements or components of an example system in which an embodiment of the subject matter disclosed herein may be implemented.

FIG. 2 is a more detailed block diagram of the basic system of FIG. 1 illustrating elements or components of an example system 200 in which an embodiment of the subject matter disclosed herein may be implemented. Some elements of FIG. 1 are also shown in FIG. 2 and bear the same reference numerals. In particular, the observation platform 120 may be coupled to computer network 205 such as the Internet, just as observer computing device 130, 132, and 132 are also connected via the network 205. A skilled artisan understands that the designation of observer 1 130 through observer n 132 indicates that any number of merchants may be shown as interfacing with the system 200 (whether such interfacing is discrete or collaborative). In this system 200 embodiment, more than one merchant computing device is shown. Thus, merchant computing devices 210, 211, and 212 may represent different merchants who may individually and independently craft observation campaigns on the observation platform 120 via the network 205. A skilled artisan understands that the designation of merchant 1 210 through merchant n 212 indicates that any number of merchants may be shown as interfacing with the system 200.

Additional computing devices may also be communicatively coupled to the observation platform 120 via the computer network 205. As will be discussed further below, the system 200 may include a number of retailer computing devices 240, 241, and 242. A skilled artisan understands that the designation of retailer 1 240 through retailer n 242 indicates that any number of merchants may be shown as interfacing with the system 200. Further, the system 200 may include computing devices associated with third party services 250, private services 251, and government services 252. Prior to discussing the additional roles for these additional computing devices, the observation platform 120 as well as the observers' and merchants' roles are discussed next.

By way of general overview of the system in FIG. 2, one embodiment may include a user-based mobile computing device 130 (e.g., a mobile phone, a smart phone, a laptop computer, and handheld computer, a wearable computing device, an augmented reality device, and the like) configured to execute an observation application to coordinate observing and collecting of real-world data. Further, the system may include an observation server computer 120 configured to send notifications that include one or more opportunities for observations of real-word data to the user-based mobile computing device 130 and configured to receive real world data observed and collected by the user-based mobile computing device 130. Further yet, the system may include a merchant-based computing device 210 communicatively coupled to the observation server computer 120 and configured to generate and control a campaign of opportunities sent by the observation server computer 120.

As briefly discussed above, the observation platform 120 may be one or more computing devices configured to work as a server computing entity in a cloud-based computing environment to establish and facilitate observation campaigns for one or merchants. As used throughout this disclosure, an observation campaign is a set of parameters established by a merchant using one or more inter-related applications operating in the system 200 and coordinated from the observation platform 120. The observation campaign may include a number of parameters designed to encourage various remote users of an observation application (e.g., observers) to collect real-world data about products and goods for sale at various retail locations.

A merchant that establishes an observation campaign using the observation platform 120 desires to know more about the retail locations and point of sale for goods and products in the marketplace. For example, a merchant may negotiate a deal to have products placed in specific eye-level locations on shelves at retail locations and may wish to verify that the products are, in fact, placed on eye-level shelves at the various retail locations. By establishing an observation campaign eliciting this kind of real-world data (e.g., digital images of the product for sale on eye-level shelves at a particular retail location), the merchant can incentivize observers (through compensation offered by the observation platform) to fulfill the requirements of the specific real-world data collection. That is, the merchant may enable an observation campaign through a contract with a proprietor of the observation platform such that the observation platform then offers monetary compensation to one or more observers in exchange for a timely and meaningful collection of real-world data (e.g., a picture) of the merchant's product for sale at a specific retail location. This eliminates the need for the merchant to employ one or more individuals to travel to the retail location to verify such real-world data.

As used herein, the term real-world data may refer to specific observable facts about anything of interest to the coordinator of the campaign. Real-world data may be data that can be collected in the real world (as opposed to data that may reside on a retailer's computer). In one example, real-world data may be a digital image of a product for sale at a retail location such that data may be gleaned from the image, such as product location on a shelf, product location in proximity to other products, product label facing outwards, product price can be seen, product price is correct, additional promotional material is proximate, and the like. Real-world data includes any observable verifiable data point collectable through any manner of sensing, recording, or observing.

Figure 3A:
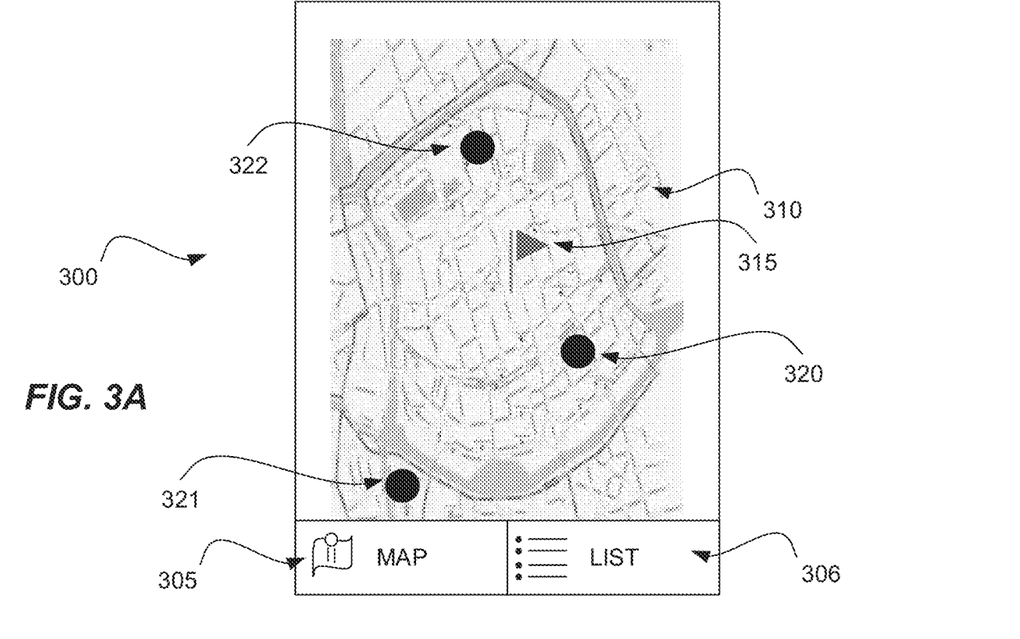
FIGS. 3A and 3B are screenshots of an observation application executing on a mobile computing device according to an embodiment of the subject matter disclosed herein.
Figure 3B:
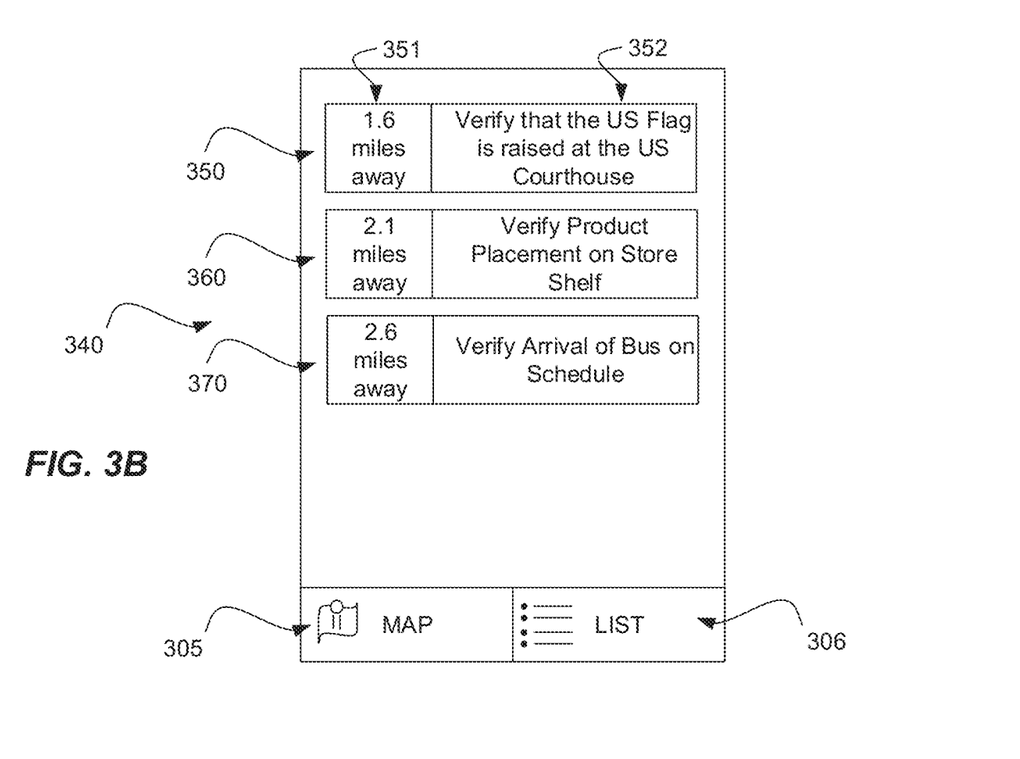

In this manner, any merchant can use the observation platform to design an observation campaign to incentivize observers to collect very specific kinds of real-world data at very specific locations over very specific time frames. When designing an observation campaign, the merchant may establish observation opportunities based on a desired time frame; for example, a campaign may only have opportunities offered for a one-week time frame or just a few hours in any given day. Further, the merchant may establish observation opportunities based on a desired location such as retail locations in a specific city or within 100 miles of a particular location. Further yet, the merchant may establish observation opportunities based on a desired total number of observation—e.g., a cap of 10 different successful observations. Any number of other campaign parameters are possible and discussed further below with respect to FIG. 3.

As opportunities for observation become active (that is, users of the observer application may be offered opportunities via the application) various observers may engage in the various opportunities. Opportunities may be sent as notifications to observers (via a smart phone application and the like). Such notifications may be influenced by geographic location of various observers (e.g., notifications are only sent to observers proximate to a desired observation retail location). For example, receiving the electronic communication corresponding to the opportunity may be based upon a prevalence or frequency of the mobile computing device being located at a location associated with the opportunity (e.g., "Do you come here often?"). Further, such notification may be influenced by a relative reputation of an observer (e.g., only the "best" observers receive certain opportunities or "What's a mobile phone like you doing in a place like this?").

Once an opportunity is received, the observer may accept the opportunity and begin an observation. Some opportunities may have time limits for acceptance of the opportunity and/or time limits for fulfillment of an accepted opportunity. The observation may be simply sending the requested real-world data to the observation platform 120 for evaluation. The observation platform may include a module for determining 260 whether the received real-world data from any observer meets the requirements and parameters of an opportunity in an active observation campaign. The determination module 260 may be configured to determine if the received real-world data from the observer (e.g., sent from user-based mobile computing device) fulfills one or more criteria for data collection in the observation campaign opportunity. Such criteria may include timeliness, image quality, data applicability, data completeness and the like.

If the determination module 260 determines that the received real-world data from an observer meets the requirements of an observation opportunity, (e.g., the opportunity has been fulfilled), then a compensation module 261 may initiate compensation to the observer for successfully fulfilling an observation campaign opportunity. Such compensation may be financial or non-financial. In one embodiment, the compensation module 261 may communicate with one or more third-party services to credit a bank account associated with the observers that fulfilled the opportunity. Further, the compensation module may also track total financial compensation to specific observers and communication said total to government services 252 on an annual or other periodic basis. In other embodiments, the compensation module 261 may communicate with other private services 251, such as social media or online retail, to provide non-financial remuneration to the observer. For example, the observer may qualify for discounts or privileges at third party locations (e.g., food coupons, gift cards, free entry into a sporting event, and the like).

The remainder of this disclosure will focus on and detail various aspects of the observer's mobile computing device and the observer application executing thereon. Thus, FIGS. 3A and 3B are screenshots of an observation application executing on a mobile computing device according to an embodiment of the subject matter disclosed herein. In FIG. 3A, the screen shot 300 shows a representative graphical user interface (GUI) that may be part of an observer application that is executing on a mobile computing device (e.g., computing device 130 of FIG. 2) associated with a user of the observation application and platform (120 of FIG. 2). The mobile computing device may be communicatively coupled to the observation platform 120 via the Internet as well as several other third party services, such as a global positioning satellite (GPS) system.

An observer may invoke the application in any known manner at the mobile computing device. If the observer has already registered with the observation platform and has established a credentialed relationship with the observation platform, a first screen may be displayed as shown in screen shot 300. If the observer has not established a credentialed relationship with the observation platform, the observer may register by providing basic contact information and set specific device permissions (e.g., location services, camera access, and the like) for the application to execute as intended. As shown, screen shot 300 includes a map display 310 as well as two soft-buttons for a map view 305 and a list view 306. Should the user press the map view button 305, the map view display 310 will be shown. Should the user press the list view button 306, the list view display (shown and discussed below with respect to FIG. 3B) will be shown.

In the map view display 310, the physical location of the observer (observer location 315) may be shown in the center of a map of the region in which the observer is currently located. The observer location 315 is indicated by a red flag, but may be any icon indicating the observer location 315. Further, physical locations of specific opportunities available to the observer may also be shown in the map view display. Thus, a first opportunity location 320, a second opportunity location 321, and a third opportunity location 322 may be shown on the map view display 310. In this manner, the observer may be able to see a map representation of opportunities available to the observer in proximity to the observer. Thus, the observer may touch any location 320, 321, or 322 to display a new interface (not shown) for additional information about the opportunity. On such a follow-on display, the observer may accept the opportunity and begin the process of collecting and submitting real-world data in fulfillment of the opportunity. Additional aspects of acceptance and fulfillment of an opportunity is discussed further below. Next, however, the observer may view opportunities in a list view.

FIG. 3B shows a screen shot 340 of a list view of opportunities available to the observer. In the list view 340, both the map view soft button 305 and the list view soft button 306 remain visible and functional for the observer. The opportunities corresponding to the location indicators 320, 321 and 322 of FIG. 3A are now shown in list form. Thus, the first opportunity 350 is shown as a current distance 351 from the observer and a description 352 of the first opportunity. Similarly, the second opportunity 360 and the third opportunity 370 are also shown in the list and may be hierarchically displayed by current distance from the observer. Other hierarchical display criteria may be used, such as compensation value offered, reputation score required, and the like. Again, the observer may touch any opportunity 350, 360, or 370 in the list to display a new interface (not shown) for additional information about the opportunity. On such a follow-on display, the observer may accept the opportunity and begin the process of collecting and submitting real-world data in fulfillment of the opportunity. Additional aspects of acceptance and fulfillment of an opportunity is discussed next with respect to the method of the flow chart of FIG. 4.

Figure 4:
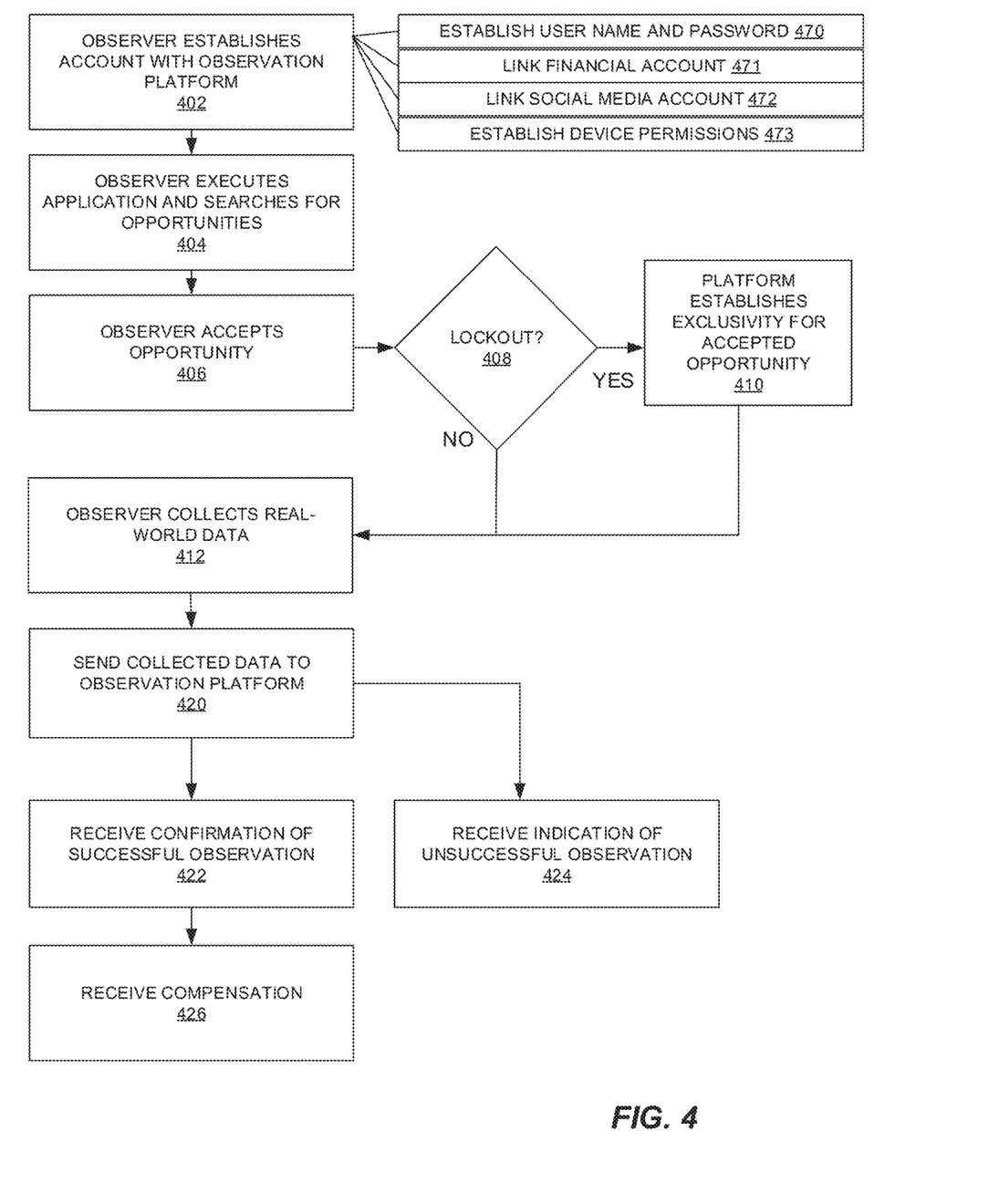
FIG. 4 is a method flow diagram illustrating a method for fulfilling a request for real-world data from an observation campaign using the example system of FIG. 2 according to an embodiment of the subject matter disclosed herein.

FIG. 4 is a method flow diagram illustrating a method for accepting and fulfilling an opportunity in an observation campaign using the example system of FIG. 2 according to an embodiment of the subject matter disclosed herein. As a general overview of the computer-based method shown in FIG. 4, the method is presented from the perspective of an observer, such that the observer may utilize one or more of various computing devices and the observation platform to establish and send an electronic communication (e.g., push notification, pull notification, text, email, and the like) corresponding to an opportunity to observe real-world data. Such a communication may be sent to one or more remote computing devices of one or more observers from the observation platform. Observers may then collect real world data, and in response to the opportunity, send the real-world data to the observation platform. The observation platform may then determine if the response (the real-world data) fulfills the opportunity. If so, the observation platform may initiate compensation to the observer that fulfilled the opportunity. These and other aspects of the underlying methods are described further below.

At the outset, the method of FIG. 4 may begin with contemporaneous (or not contemporaneous) actions on the part of merchants and observers. For the remainder of the discussion with regard to FIG. 4, the merchants and observers will be referred to in a singular sense, although it is understood that there may be many simultaneously acting merchants and observers with respect to the observation platform. Thus, an observer may establish an account (download software and applications, register as a user/observer, and the like). Although an observer may immediately begin search for and fulfilling opportunities to collect real-world data, the observer may further establish specific parameters about the newly established account (or these specific parameters may be modified at any time, just the same). These specific parameters may include establishes or modifying a username and password 470 (e.g., credentials), linking a financial account 471 (e.g., a bank, PayPal™ account, and the like), linking a social media account 472 (e.g., Facebook™, and the like), and establishing device permissions 473 (e.g., location service, camera access, and the like).

Once a platform relationship has been sufficiently established by the observer and after setting one or more of the specific parameters discussed above, the observer may then seek out opportunities through the application executing on a computing device associated with the observer at step 404. The opportunities may be displayed to the observer in a map view or a list view as discussed above with respect to FIGS. 3A and 3B. Not all possible opportunities may be presented to the observer. For example, in one embodiment, observers may too far from certain opportunities, and therefore, distance restrictions simply prevent the opportunity from being offered. In another embodiment, an observer may be associated with a reputation score based on frequency and ratio of successful observations, and, thus, some opportunities may only be presented to observers with a sufficient reputation score. In still another embodiment, some opportunities may only be presented to observers who have just successfully completed a pre-requisite observation (e.g., a follow-on opportunity to enhance the collected real-world data). A number of additional criteria are contemplated for presenting opportunities to observers, but are not discussed herein for brevity.

At step 406, an observer may choose to accept an opportunity that is presented. This may be done by following prompts via the application, such as clicking through on follow-on links and such. In one embodiment, the opportunity being offered may be established as an exclusive opportunity to the first observer (or group of observers e.g., the first ten observers), such that an exclusive lockout procedure may be invoked. Thus, the method may move to a query step 408 to determine if the opportunity is an exclusive opportunity that follows a lockout procedure. If this opportunity is an exclusive offer, the method may establish the accepting observer as having an exclusive opportunity to collect the data requested. This may be established at the observation platform at step 410. In such an embodiment, the particular accepted opportunity is then no longer available to any other observer until the accepting observer fulfills the observation data collection or fails to do so within a specific time frame. In one embodiment, the exclusive time period (e.g., lockout time) may be one hour, though other time frames are contemplated.

Other lockout scenarios may be possible. For example, the opportunity may be locked out for acceptance by other observers who have not fulfilled any previous opportunities in any manner or fulfilled only a few opportunities in the past. That is, seasoned or veteran observers may or may not be locked out of certain quasi-exclusive opportunities. Further, opportunities may be grouped together for exclusivity such that two different opportunities may become exclusive opportunities, if and only if, an observer accepts both opportunities. This may incentivize an observer to accomplish more than one observation with the promise of exclusivity. Still further, observers may have an established reputation score and/or performance history that may include different opportunities that are exclusively offered only to observers with a high-enough reputation score.

Whether the opportunity is exclusive or otherwise, the method moves to step 412 where an observer may then seek to collect the requested data in an attempt to fulfill the opportunity. The observer may travel to the location where the data can be collected, e.g., physically navigate to a store (commonly identified by address) so as to observe the real-world data and create documented evidence (e.g., digital image, digital recording, text-based data recreation, and the like) of the real-world data. The application may invoke other third-party applications such as GPS navigation application, turn-by-turn direction applications and the like. In other embodiments, these features are embedded in the application executing the observer application on the observer's mobile computing device. Once the observer determines that the location has been identified and reached, the observer may then collect real-world data.

A great number of particular methods for collecting real-world data may be accomplished. The manner in which real-world data is collected may include but is not limited to: collecting real-world data by image capture using a digital camera in the mobile computing device, collecting real-world data by video capture using a digital camera in the mobile computing device, collecting real-world data by audio recording using an audio recorder in the mobile computing device, collecting real-world data by using a thermometer device in the mobile computing device, collecting real-world data by using a pressure gauge in the mobile computing device, collecting real-world data by receiving textual input to corroborate visual evidence entered by the observer into the mobile computing device, and the like.

Once the observer collects the real-world data that is requested in order to fulfill the opportunity, the observer may then send an electronic communication with the collected real-world data to the observation platform at step 420. The sending may be an iterative process whereby initial data may be sent, and upon successful transmission and/or verification, additional collected real-world data may be sent. When all intended real-world data that has been collected with intention to fulfill an opportunity is transmitted to the observation platform, a number of activities may then be initiated at the observation platform depending on analysis of the received real-world data. Such activities may not be depicted in the method flow chart of FIG. 4, but remain part of an overall method and system of interactions between the observation platform and one or more observer computing devices.

Thus, the received real-world data is first and foremost analyzed as to whether or not the real-world data is responsive to the opportunity. That is, a number of determinations may be made so as to indicate whether the real-world data fulfills the opportunity, such as an assessment of whether any images or video match the required observation focus (e.g., is it the right product being assessed), whether the data is timely based on a time stamp of the created real-world data, whether the data originated from a proper location based on GPS coordinates of the transmitting mobile device, other corroborating evidence such as images of the location itself along with the underlying focus item, and legibility of the collected data (e.g., images are clear and show item name, store name, price, location, and the like). Any number of other criteria may also be used to determine the validity of the received real-world data. These additional criteria are not discussed herein for brevity.

If the observation platform determines that the received real-world data is sufficient to fulfill the opportunity, then the observer may receive a communication of a successful observation at step 422. If the collected real-world data is determined to not meet the criteria for a successful observation, and unsuccessful observation may be communicated to the observer at step 424. In some embodiments, the observer may have an opportunity to remedy the collected real-world data in an effort to still fulfill the opportunity. In other embodiments, the observer may be locked out from accepting the observation opportunity after one or more unsuccessful attempts to fulfill.

If successful, the observer may also receive compensation for a successful observation at step 426. Compensation may be granted to the observer or otherwise delivered to the observer in a number of different ways such as financial compensation, non-financial compensation (e.g., free merchandise, discounts, coupons, appreciation events, and the like), observer reputation score increases, and unlocking of additional observation opportunities.

In addition to direct compensation in some manner, additional events may be triggered by a successful or unsuccessful observation. In one embodiment, a successful opportunity fulfillment may trigger a new opportunity being sent directly to the observer that just successfully fulfilled the opportunity. This may be a bonus opportunity linked to a first opportunity or may be an exclusive opportunity offered to observers that are currently fulfilling opportunities. In another embodiment, a successful observation may trigger an opportunity to be communicated to a different observer in an effort to verify the recently fulfilled opportunity. In essence, a more seasoned observer may be called upon to verify the real-world data collected by a newcomer observer. In another embodiment, once the opportunity has been fulfilled, the opportunity may then be removed from an opportunity list for all observers since the required real-world data has now been collected.

With regard to the flow chart depicting the embodiment described in FIG. 4, a skilled artisan understands that any of these steps may be performed in any order as the layout of the flowchart is but one example embodiment of a method described herein.

Figure 5:
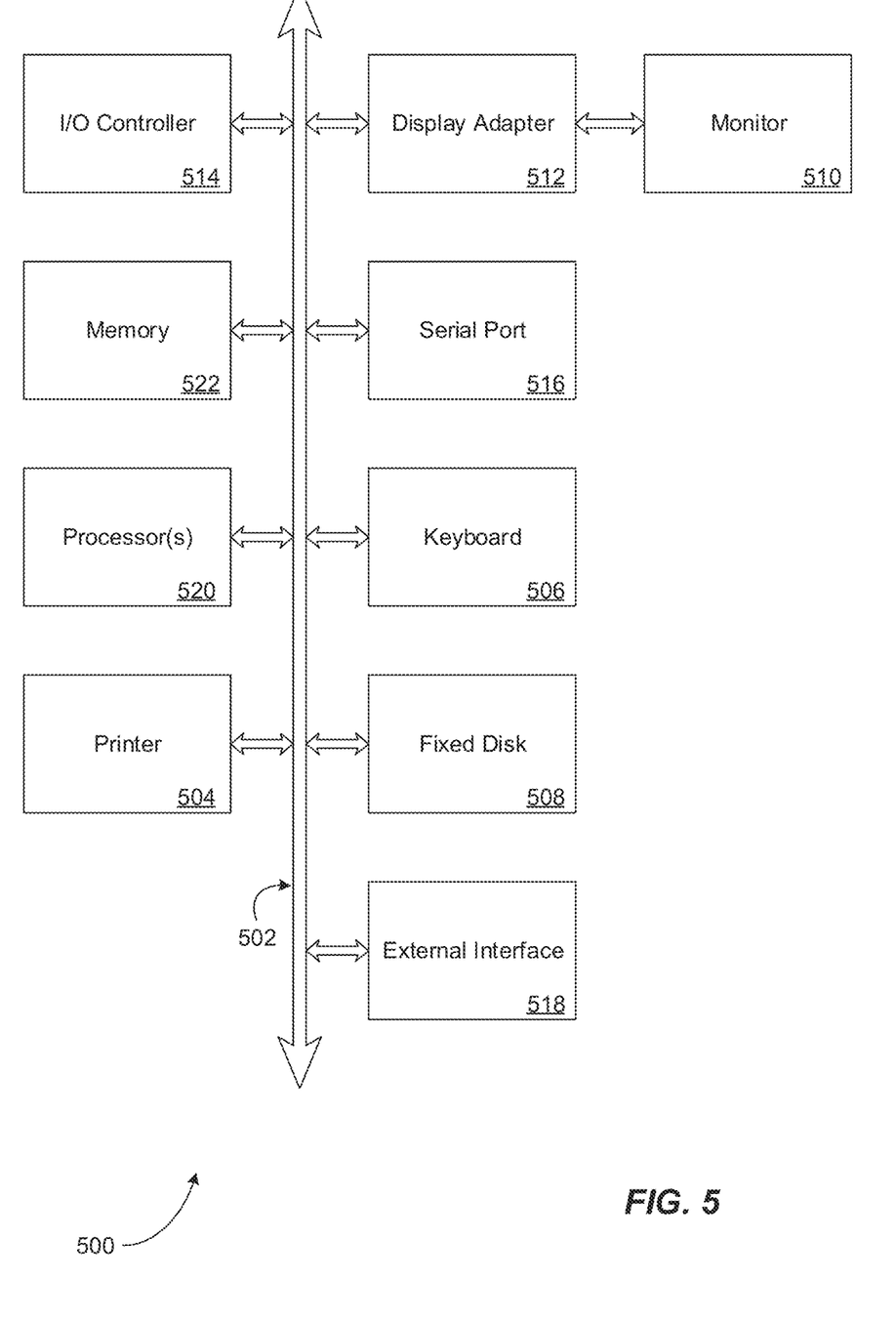
FIG. 5 is a diagram illustrating elements or components that may be present in a computer device or system configured to implement a method, process, function, or operation in accordance with an embodiment.

FIG. 5 is a diagram illustrating elements or components that may be present in a computer device or system configured to implement a method, process, function, or operation in accordance with an embodiment. In accordance with one or more embodiments, the system, apparatus, methods, processes, functions, and/or operations for enabling efficient configuration and presentation of a user interface to a user based on the user's previous behavior may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 5 is a diagram illustrating elements or components that may be present in a computer device or system 500 configured to implement a method, process, function, or operation in accordance with an embodiment. The subsystems shown in FIG. 5 are interconnected via a system bus 502. Additional subsystems include a printer 504, a keyboard 506, a fixed disk 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 5 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

It should be understood that the present disclosures as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

That which is claimed is:

1. A computer-based method, comprising:
receiving a first electronic communication as a push notification corresponding to an opportunity to observe real-world data about a product for sale, the first electronic communication sent to a mobile computing device of a user executing a real-world observance opportunity application, the electronic communication sent from a data observation computing platform executing a real-world observance opportunity platform, the opportunity related to an observation campaign administered by the real-world observance opportunity platform, wherein receiving the electronic communication corresponding to the opportunity is based upon proximity of the mobile computing device to a location associated with the opportunity and comprises a limited time window as a subset of a business day;
indicating acceptance of the opportunity within the limited time window at the mobile computing device and exclusively locking out the opportunity from activity by others at the data observation computing platform;
collecting real-world data corresponding to the opportunity through activity directed by the user of a mobile computing device, the collected real-world data comprising audio visual data about the product and meta data about the location of the product;
sending the collected real-world data to the observation computing platform from the mobile computing device within the limited time window;
receiving a second electronic communication as a push notification at the mobile computing device indicating that the collected real-world data does not comply with a threshold for the audio visual data or does not comply with a location requirement of the opportunity in response to an analysis that is executed by the real-world observance opportunity platform while the opportunity remains exclusively locked out by the user;
sending different collected real-world data to the observation computing platform in response to the second electronic communication caused by the analysis;
unlocking the opportunity in response to receiving the different real-world collected data; and
receiving a third electronic communication as a push notification indicating initiation of compensation to the user if the collected real-world data is determined to fulfill the opportunity in response to a second analysis that is executed by the real-world observance opportunity platform.

2. The computer-based method of claim 1, further comprising receiving the first electronic communication corresponding to the opportunity based upon a rating of the user of the mobile computing device.

3. The computer-based method of claim 1, further comprising receiving the first electronic communication corresponding to the opportunity based upon a prevalence of the mobile computing device being located at a location associated with the opportunity.

4. The computer-based method of claim 1, further comprising executing a real-world data collection application at the mobile computing device for fulfilling the data collection corresponding to the opportunity.

5. The computer-based method of claim 1, wherein the compensation further comprises coordination of a third party service to provide financial compensation to the user.

6. The computer-based method of claim 1, wherein the compensation further comprises non-financial compensation to the user.

7. The computer-based method of claim 1, further comprising receiving a fourth electronic communication indicating an availability of a second opportunity in response to successfully fulfilling the opportunity corresponding to the first electronic communication.

8. The computer-based method of claim 1, further comprising:
sending a fourth electronic communication to the observation platform corresponding to an acceptance of an opportunity; and
receiving a fifth electronic communication from the observation platform with an indication that the opportunity is exclusively locked out from other observers.

9. The computer-based method of claim 1, further comprising incrementing a reputation score associated with the observer in response to successfully fulfilling the opportunity.

10. A mobile-computing device, comprising:
a processor configured to execute computer-executable instructions;
a display coupled to the processor and configured to display a graphical user interface in response to the executing of the computer-executable instructions;
a memory coupled to the processor and configured to store data in response to the executing of the computer-executable instructions; and
a communication module coupled to the processor and configured to send and receive electronic communications regarding opportunities to observer real-world data;
wherein the computer-executable instructions, when executed, cause:
executing a real-world data observance opportunity application at the mobile device that is communicatively coupled to an observation computing platform;
receiving a first electronic communication as a push notification from the observation computing platform corresponding to an opportunity to observe real-world data about a product for sale within a limited time window that is a subset of a business day, the opportunity related to an observation campaign administered by the observation computing platform;
facilitating acceptance of the opportunity by the mobile computing device and exclusively locking out the opportunity from activity by others at the observation computing platform within the limited time window;
facilitating collecting real-world data corresponding to the opportunity through activity directed by the user of mobile computing device, the collected real-world data comprising audio visual data about the product and meta data about the location of the product;
sending the collected real-world data to the observation computing platform within the limited time window;
receiving a second electronic communication as a push notification indicating that the collected real-world data does not comply with a threshold for the audio visual data or does not comply with a location requirement of the opportunity response to an analysis that is executed by the real-world observance opportunity platform while maintaining the opportunity as locked out within the limited time window;
sending different collected real-world data to the observation computing platform in response to the second electronic communication caused by the analysis within the limited time window;

unlocking the opportunity in response to receiving the different real-world collected data; and receiving a third electronic communication as a push notification from the observation computing platform indicating initiation of compensation if the collected real-world data is determined to fulfill the opportunity in response to a second analysis by the observation computing platform.

11. The computing system of claim 10, wherein the collected real-world data comprises a digital image of a product for sale at a retail location.

12. The computing system of claim 10, wherein the real-world data collected comprises a price of a product for sale at a retail location.

13. The computing system of claim 10, wherein the collected real-world data comprises a temperature of the location of the opportunity.

14. The computing system of claim 10, collected real-world data comprises a status of an object corresponding to the location of the opportunity.

15. The computing system of claim 10, wherein the collected real-world data comprises a pressure of the location of the opportunity.

16. The computing system of claim 10, wherein the collected real-world data comprises a verification of previously collected real-world data.

17. The computing system of claim 10, wherein the mobile computing device comprises one of the group comprised of: a mobile phone, a smart phone, a laptop computer, and handheld computer, a wearable computing device, and an augmented reality device.

18. A cloud-based multi-user observation computing system, comprising:

a first user-based mobile computing device executing an observation application configured to communicate with a server computer hosting observation opportunities;

a second user-based mobile computing device executing an observation application configured to communicate with the server computer hosting observation opportunities;

a cloud-based observation platform that includes the server computer for hosting the observation opportunities, the observation platform configured to communicate one or more opportunities via one or more push notifications to one or more user-based mobile computing devices and configured to receive real-world data collected by one or more of the plurality of user-based mobile computing devices, each opportunity having a limited time window to be fulfilled as a subset of a business and configured to be exclusively locked out from activity by others in response to acceptance of an opportunity at the first user-based mobile computing device within the limited time window, the opportunity configured to be unlocked from exclusive activity in response to a failure with the first user-based mobile computing device within the limited time window;

wherein the second user-based mobile computing device is configured to receive a push notification communication corresponding to a follow-on opportunity in response to the first user-based mobile communication device collecting and communicating real-world data about a product for sale that includes data that does not comply with a threshold for the audio visual data or does not comply with a location requirement of the opportunity within the limited time window, wherein the follow-on opportunity is the same as the initial opportunity.

19. The cloud-based multi-user observation computing system of claim 18, wherein the follow-on opportunity further comprises an opportunity to verify the collected real-world data that was communicated in response to the initial opportunity.

20. The computer-based method of claim 1, wherein the collected real-world data is at least one of the group comprised of: a sound-pressure level, a barometric pressure level, and a temperature level.

* * * * *